Patented June 4, 1929.

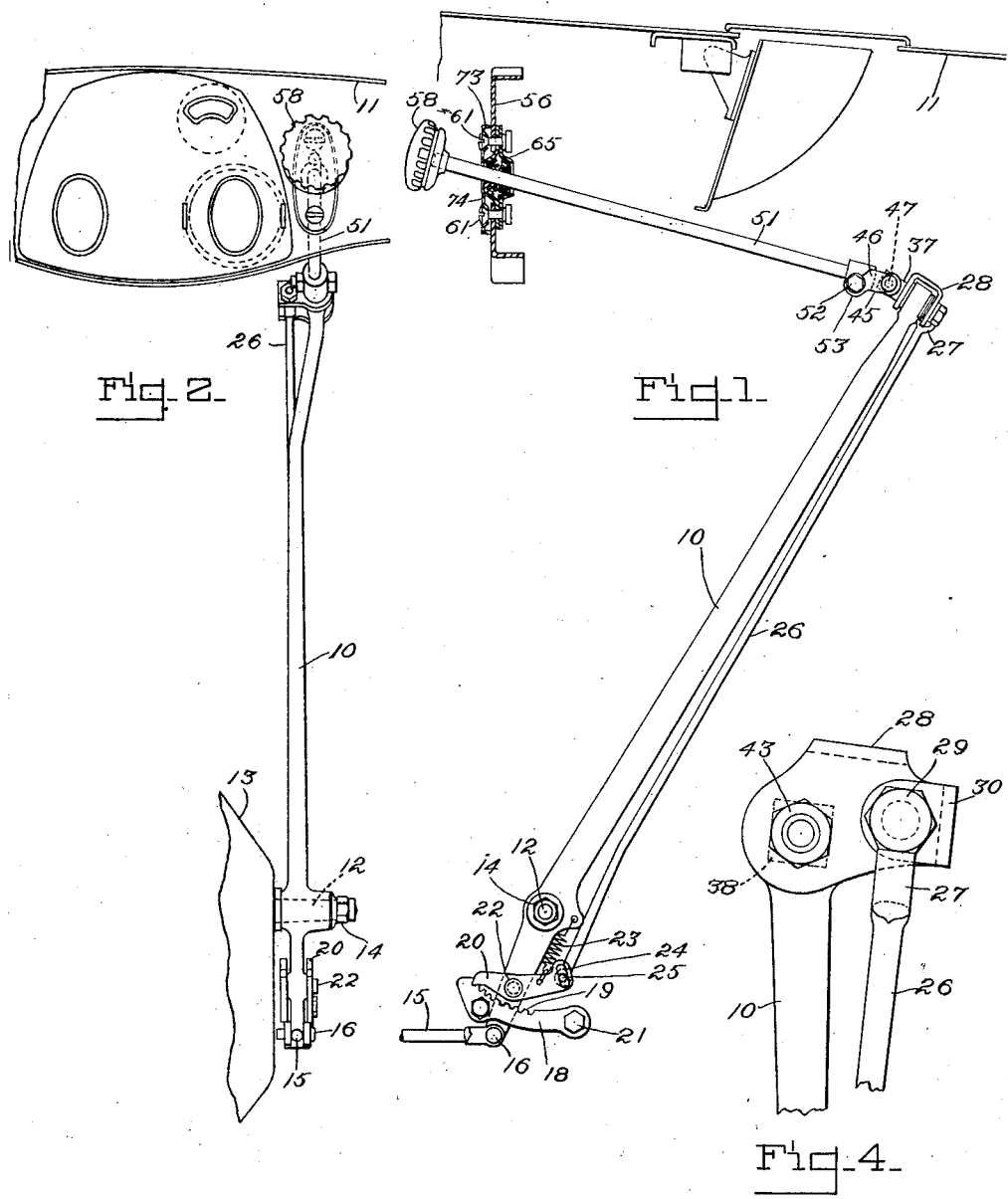

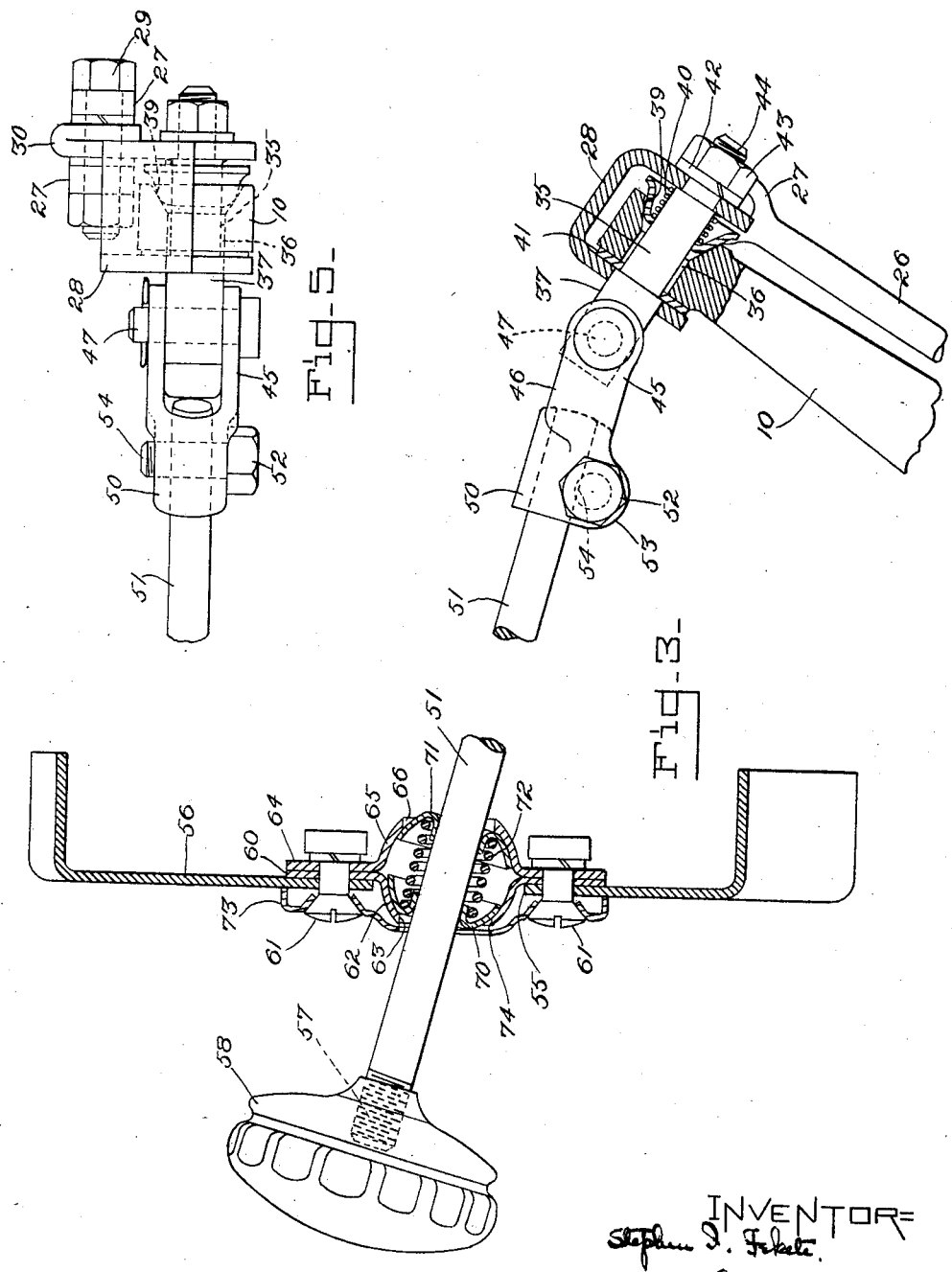

1,715,997

UNITED STATES PATENT OFFICE.

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN.

BRAKE-LEVER ATTACHMENT.

Application filed April 9, 1927. Serial No. 182,459.

This invention relates to brake operating mechanism for a vehicle, such as an automobile, and more particularly to the provision of means for operating the brake mechanism from an easily accessible point within the vehicle.

In certain types of automobiles it is desirable to arrange the mechanism within the vehicle for operating the same so as to provide ample unobstructed space for its occupants. With this in view it has been common heretofore to position the operating lever for the emergency brake so that it extended upwardly and forwardly under the cowl a considerable distance. This is very desirable but, heretofore, has rendered the emergency brake inaccessible and inconvenient to operate. Most drivers of an automobile seldom use the emergency or hand brake except to park the car or in case of a sudden emergency where it is desirable to obtain maximum braking power to stop the vehicle as soon as possible. The operator of the vehicle often fails to locate and operate the hand brake as quickly as is desired when emergencies arise.

It is an object of the present invention to provide an extension for the operating lever of the hand brake in the form of a rod extending from an easily accessible point, such as the instrument board, and connected with the operating lever so that the latter may be readily actuated, the rod and operating lever preferably being connected by a lever which may be operated by turning the rod to disengage the locking dog.

The invention will be more clearly understood from the following description in conjunction with the accompanying drawings; in which Fig. 1 is an elevational view of a brake operating lever embodying the invention.

Fig. 2 is an elevational view of the same as seen from the instrument board of the vehicle.

Fig. 3 is a detail sectional elevational view of certain parts as shown in Fig. 1.

Fig. 4 is a detail end elevation of the lever connecting the extension rod and the operating lever; and Fig. 5 is a plan view of the same.

In the drawings a brake operating lever 10 is shown extending upwardly and forwardly a substantial distance beneath the cowl 11 of a vehicle and is pivotally mounted to swing upon a stud 12 extending from a portion of the chassis of the vehicle, such as the housing 13 for the clutch, the lever 10 being held upon the stud 12 by a lock nut 14. One arm of the lever 10 extends downwardly and is pivotally connected with a rod 15 extending to the brake mechanism by a pin 16. A suitable rack 18 having teeth 19 in operative association with one end of a locking dog 20 is mounted upon the vehicle chassis by bolts 21. The dog 20 is pivotally mounted upon a stud 22 on the lever 10 and normally is held in engagement with the teeth 19 by a spring 23. The other end of the dog is provided with a slot 24 in which a pin 25 upon one end of a rod 26 is slidably mounted. The other end of the rod 26 is provided with a yoke 27 which is pivotally connected with a lever 28 by a pin 29. The lever 28 preferably is of U-shape and extends so as to embrace two opposite sides of the upper end of the operating lever 10 and preferably is spaced therefrom. One arm of the lever 28 preferably is provided with an extension 30 which is folded upon itself so as to form a suitable bearing for the pin 29.

A stud 35 is mounted in a relatively large opening 36 in the lever 10 so as to be laterally movable therein. One end of the stud 35 is provided with a relatively large portion 37, preferably of rectangular shape, which fits in a similarly shaped opening 38 in one arm of the U-shaped lever 28. The opening 36 is tapered at one end to form a suitable engaging surface for a bearing 39 surrounding the stud 35 and which is resiliently held in engagement with the tapered portion of the opening 36 by a spring 40 extending from the bearing 39 to one arm of the U-shaped lever 28. A washer 41 surrounds the stud 35 between the lever 10 and the other arm of the U-shaped lever 28. The stud 35 is held against longitudinal movement relative to the lever 28 by a split washer 42 and a nut 43 engaging a threaded portion 44 of the stud. The enlarged end 37 of the stud 35 is pivotally connected with the yoke 45 on one end of a link 46 by a pin 47. The other end of the link 46 is provided with a split sleeve 50 which is clamped upon one end of an extension rod 51 by a bolt 52 extending between the ears 53 upon the sleeve 50, the rod 51 preferably being provided with a notch 54 which hooks around the bolt 52.

The rod 51 extends through an opening 55 in the instrument board 56 and is provided with a threaded end portion 57 to receive a knob 58 or other suitable gripping device. A plate 60 is secured upon the dash side of the instrument board 56 by bolts 61 and is provided with a flared portion 62 surrounding an opening 63 for the rod 51. A second plate 64 is secured over the plate 60 by bolts 61 and is provided with a flared portion 65 extending in a direction opposite to the flared portion 62 of the plate 60 and is provided with an opening 66 for the rod 51. A pair of hollow ball members 70 and 71 are slidably mounted on the rod 51 and are resiliently held in engagement with the flared portion of the plates 60 and 64 respectively by a spring 72 extending therebetween. A trim panel 73 provided with an opening 74 for the rod 51 is mounted on the visible side of the instrument board 56 by the bolts 61.

In order to apply the emergency brakes to stop the vehicle the operator grasps the knob 58 and pulls the rod 51 towards him which swings the operating lever 10 to move the rod 15 and thus apply the brakes. When it is desired to release the brakes, the rod 51 is turned counter-clockwise to disengage the dog 20 from the teeth 19 of the rack 18 and thereby permitting the rod 51 to move forward to operate the usual mechanism to release the brakes.

What I claim is:

1. In a brake mechanism for a vehicle, the combination with an operating lever and a dog for locking the same, of an extension for the lever comprising a rod longitudinally movable to swing said operating lever, a second lever pivotally connected with said dog and embracing opposite sides of said operating lever and spaced therefrom, a stud fixed to said second lever and pivotally connected to said rod but laterally movable within said operating lever.

2. In a brake mechanism for a vehicle, the combination with an operating lever and a dog for locking the same, of an extension for the lever comprising a rod longitudinally movable to swing said operating lever, a second lever pivotally connected with said dog and embracing opposite sides of said operating lever and spaced therefrom, a stud fixed to said second lever and pivotally connected to said rod but laterally movable within said operating lever, and a spring surrounding said stud between said levers.

3. In a brake mechanism for a vehicle, the combination with an operating lever and a dog for locking the same, of an extension for the lever comprising a rod longitudinally movable to swing said operating lever, a second lever pivotally connected with said dog and embracing opposite sides of said operating lever and spaced therefrom, a stud fixed to said second lever and pivotally connected to said rod but laterally movable within said operating lever, a bearing surrounding said stud between said levers, and a spring adapted to maintain engagement between said operating lever and bearing.

4. In a brake mechanism for a vehicle, the combination with an operating lever and a dog for operating the same, of an extension for the lever comprising a rod extending through an opening in the instrument board, connections between said rod and lever and dog whereby said rod may be rotated about its axis to unlock said dog and may be moved axially to swing said lever, and a resiliently movable bearing for said rod closing said opening.

In testimony whereof I affix my signature.

STEPHEN I. FEKETE.